United States Patent Office

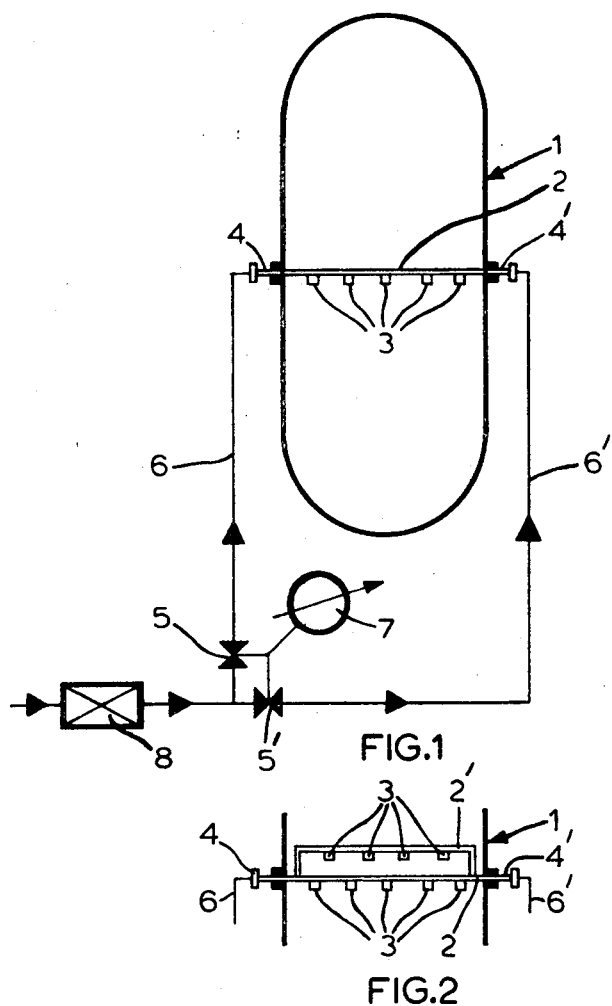

3,494,560
Patented Feb. 10, 1970

---

3,494,560
INSTALLATION FOR SPRAYING A MEDIUM
Johannes H. M. Muselaers, Sittard, Wim van der Linde, and Hendrik A. Korpel, Geleen, and Jacques Van Linden, Stein, Netherlands, assignors to Stamicarbon, N.V., Heerlon, Netherlands
Filed Apr. 8, 1968, Ser. No. 719,404
Claims priority, application Netherlands, Apr. 8, 1967, 6705026
Int. Cl. B05b *17/04*
U.S. Cl. 239—61                                    3 Claims

ABSTRACT OF THE DISCLOSURE

For spraying fluid medium from tube having a plurality of outlets spaced along its length, especially in instances where matter will tend to precipitate from the medium if the medium is allowed to travel at low velocity, fluid medium supply lines are connected to both ends of the tube and the proportion of fluid medium supplied by each supply line changed from time-to-time, preferably using control valves connected to a common operator arranged to open the control valve of one line by the amount it closes the control valve of the other line and vice versa. The apparatus and process disclosed are particularly useful for spraying urea in a melamine production unit.

BACKGROUND OF THE INVENTION

The invention relates to apparatus for delivering a medium to discharge points arranged at some intervals on one or more feed lines.

The apparatus and process of the invention are particularly useful for spraying liquid urea in a melamine production unit.

In a feed line of constant section on which discharge points are arranged at some distance from each other, as for example sprayers on a line, the flow velocity of the medium falls off towards the last discharge point. If, at a low velocity of the medium, precipitates are allowed to settle in the line, the line will gradually clog up from the last discharge point, and, finally, get choked completely.

A special complication arises in the preparation of melamine, where liquid urea has to be fed to sprayers in a vessel in which the temperature is considerably above that of the liquid urea. The trouble springs from the circumstance that at the low flow-velocity of the urea in the feed line(s), the urea absorbs much heat, and thus gets heated up so high that solid biuret and/or triuret will form from the urea, which solid products will then deposit in the line and, ultimately, give rise to obstructions.

Known measures to prevent such obstructions are:

1. A gradual or stepwise reduction of the feed-line diameter in the direction of the last discharge point. At a low take-off at the discharge points, preservation of the required flow velocity calls for such a small end diameter of the pipe that for constructional reasons among others, this measure is not a very suitable one.

2. The passage through the discharge piping system of a volume of medium larger than that needed for feeding the discharge points. The feed unit for the medium must then be made much larger than would be necessary to ensure sufficient supply to the discharge points, so that medium must be carried off, and recycled if necessary. This has an adverse effect on the economy of the process.

Mere introduction of the medium into the feed line from both ends does not give a solution, because in that case there is a zone somewhere between the discharge points where the flow velocity is so low that, depending on the circumstances, a precipitate is liable to form.

SUMMARY OF THE INVENTION

The invention provides an installation which does not have the abovementioned drawbacks. This has been achieved by connecting both ends of the outlet tube(s) or feed line(s) to supply lines for the medium, and by including, at or near each of said ends, a control valve in the said supply lines, which control valves are either coupled, or combined into one unit, and periodically distribute the feed in such a manner that while the feed at one end is being reduced from a maximum to a minimum, the feed at the other end(s) is being increased from a minimum to a maximum value, and reversely.

Although the outlet tube or feed line will now also contain a zone in which the flow velocity is very low, or substantially zero, it is achieved by the present invention that the said zone will periodically travel from the one end of the outlet tube or feed line to the opposite end. The flow velocity at all points in the outlet tube or feed line will then regularly build up to a level sufficing to render precipitation impossible in those cases where this would otherwise be liable to occur.

In the abovementioned case where urea is supplied to sprayers in a hot vessel, the average flow velocity can at all points in the sprayer tube or feed line be raised so high that the liquid urea will at no point take up so much heat, and be heated to such a high value that solid biuret or triuret is formed out of the urea.

BRIEF DESCRIPTION OF THE DRAWING

The principles of the invention will be further hereinafter discussed with reference to the drawing wherein preferred embodiments are shown. The specifics illustrated in the drawing are intended to exemplify, rather than limit, aspects of the invention as defined in the claims.

FIGURE 1 is a diagrammatic view of apparatus provided in accordance with the principles of the invention, for instance for spraying urea into a vessel of a melamine production unit; and FIGURE 2 is a fragmentary view similar to a portion of FIGURE 1, showing a modification, wherein the outlet tube or feed line consists of two elements both connected to the two supply lines in parallel; the remainder of this embodiment being as shown in FIGURE 1.

DESCRIPTION OF THE PREFERRED EMBODIMENTS

A vessel 1 is provided with a feed line 2 for delivering liquid urea to sprayers 3. Near the ends 4 and 4' of the feed lines control valves 5 and 5' are provided, which, by means of pipe sections 6 and 6' are connected with the ends 4 and 4'.

These control valves 5 and 5' are interconnected. The connection may be provided by conventional means normally used to interconnect control valves and may, for instance, be mechanical, pneumatic, hydraulic, magnetic or electric in character. When they are coupled mechanically, the valves 5 and 5' may also be combined to form one unit, such as a multiway valve; in the embodiment illustrated a three-way valve has been used for this purpose. A common operating member 7 periodically adjusts the position of the coupled valves. Operating member 7 further functions entirely independently, and can be set to effect any desired number of periodic adjustments. Such programmable automatic valve operators are commercially available.

In the example illustrated, liquid urea with a temperature of about 140° C. is supplied by means of one or several pumps 8.

When control valve 5 allows, for instance, 90% of the total volume of urea needed at the sprayers 3 to pass to the end 4 of the feed line 2, the volume flowing to the end 4' through valve 5' is reduced to 10%. Member 7 now varies the position of the valves, by opening one as it closes the other, that the former volume is gradually brought down from 90%, to 10%, and the latter volume is simultaneously raised from 10% to 90%. A zone with a low flow velocity of the medium will at first be present near end 4'; according as the valve positions are changed, this zone will travel towards end 4, to return again to end 4' during the further periodic adjustment, and so on.

The temperature in vessel 1 is 350 to 400° C. It appears that with the feed line(s) construction shown in the embodnment of FIGURE 1 only a few cycles per hour are needed to keep the average flow velocity high enough for preventing local build-up of undesirable high temperatures, and, hence, formation of biuret or triuret. The flow velocity in the lines 6 and 6' is not reduced to zero, so as to prevent undue cooling and undesirable solidification of urea in the supply lines 6 and 6'. Where reference is made herein to one feed line to the sprayers 3, this may also consist of two or more parallel-connected lines 2, 2', etc. as illustrated in FIG. 2 with common supply lines 6 and 6' for the medium. Further, a feed line will normally connect at either end to a supply line for the medium. The feed line to the sprayers may, in principle, also be constructed as a star-shaped line. The medium may then be supplied to three or more outer ends of the star-shaped feed line via an equally large number of coupled control valves.

It is evident that an installation as outlined hereinbefore can also be used for handling other liquid media, as well as gases. The installation may also be used for supplying an equal average feed volume to sprayers, or other discharge points, in those cases where the use of the discharge points produces a large pressure drop of the medium in the feed line.

It should now be apparent that the apparatus and process for spraying a medium as described hereinabove possesses each of the attributes set forth in the specification under the heading "Summary of the Invention" hereinbefore. Because the apparatus and process for spraying a medium of the invention can be modified to some extent without departing from the principles of the invention as they have been outlined and explained in this specification, the present invention should be understood as encompassing all such modifications as are within the spirit and scope of the following claims.

What is claimed is:

1. Apparatus for spraying fluid medium comprising:
   at least one feed line having means defining a plurality of outlets thereon spaced along the length thereof, said feed line having a plurality of ends;
   at least two supply lines for supplying fluid medium to said feed line, each supply line being connected to a respective one of said feed line ends;
   flow control valve means interposed in each of said supply lines;
   a valve operator of the type constructed and arranged to simultaneously, proportionately open and close a plurality of control valves; and
   means interconnecting all said control valve means with said valve operator for operation thereby, whereby the proportion of said fluid medium supplied to said feed line by all said control valve means may be increased and decreased while maintaining constant the total amount of fluid medium supplied by all of the supply lines to the feed line per unit time.

2. The apparatus of claim 1, wherein said control valve means comprises a multi-way valve interposed in all of said supply lines.

3. The apparatus of claim 1, wherein the feed line comprises a tube having two opposite ends; said apparatus also including a second feed line having means defining a plurality of outlets thereon spaced along the length thereof, said second feed line comprising a tube having two opposite ends, means connecting the two tubes to two opposite ends in parallel with respective of said supply lines.

References Cited

UNITED STATES PATENTS

| | | | |
|---|---|---|---|
| 2,566,227 | 8/1951 | Paden et al. | 260—249.7 |
| 3,013,497 | 12/1961 | Schneider | 137—599 X |
| 3,097,073 | 7/1963 | Hildyard et al. | 239—61 X |
| 3,158,611 | 11/1964 | Crowley et al. | 260—249.7 |

ALLEN N. KNOWLES, Primary Examiner

J. J. LOVE, Assistant Examiner

U.S. Cl. X.R.

137—599; 260—249.7